United States Patent
Yi et al.

(10) Patent No.: US 10,531,320 B2
(45) Date of Patent: Jan. 7, 2020

(54) METHOD FOR PERFORMING UPLINK PACKET MEASUREMENTS IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/739,084

(22) PCT Filed: Jul. 19, 2016

(86) PCT No.: PCT/KR2016/007824
§ 371 (c)(1),
(2) Date: Dec. 21, 2017

(87) PCT Pub. No.: WO2017/014523
PCT Pub. Date: Jan. 26, 2017

(65) Prior Publication Data
US 2018/0184312 A1   Jun. 28, 2018

Related U.S. Application Data

(60) Provisional application No. 62/202,899, filed on Aug. 9, 2015, provisional application No. 62/195,274, filed on Jul. 21, 2015.

(51) Int. Cl.
*H04W 24/08* (2009.01)
*H04W 24/10* (2009.01)
(Continued)

(52) U.S. Cl.
CPC ............. *H04W 24/08* (2013.01); *H04L 43/06* (2013.01); *H04L 43/0852* (2013.01);
(Continued)

(58) Field of Classification Search
None
See application file for complete search history.

(56) References Cited

U.S. PATENT DOCUMENTS

2008/0267110 A1* 10/2008 Cai ..................... H04B 7/2606
370/315
2009/0276677 A1* 11/2009 Saito ..................... H04L 1/0047
714/750
(Continued)

FOREIGN PATENT DOCUMENTS

| EP | 2887726 A1 | 6/2015 |
|---|---|---|
| WO | 2014084499 A1 | 6/2014 |
| WO | 2015060544 A1 | 4/2015 |

*Primary Examiner* — Hassan A Phillips
*Assistant Examiner* — Gautam Sharma
(74) *Attorney, Agent, or Firm* — Dentons US LLP

(57) ABSTRACT

The present invention relates to a wireless communication system. More specifically, the present invention relates to a method and a device for performing UL packet measurements in a wireless communication system, the method comprising: receiving configuration information for a plurality of logical channels from an eNB, wherein each of the plurality of logical channels is associated with one of a plurality of logical channel priorities, determining a packet delay for a logical channel priority among the plurality of logical channel priorities by calculating packet delays for PDCP SDUs belonging to a set of logical channels having the logical channel priority, and transmitting a report including the logical channel priority and the packet delay for the logical channel priority to the eNB.

14 Claims, 13 Drawing Sheets

(51) Int. Cl.
*H04L 12/26* (2006.01)
*H04L 12/24* (2006.01)

(52) U.S. Cl.
CPC ......... *H04L 43/0858* (2013.01); *H04W 24/10* (2013.01); *H04L 41/5022* (2013.01)

(56) References Cited

U.S. PATENT DOCUMENTS

| | | | |
|---|---|---|---|
| 2010/0034187 A1* | 2/2010 | Kumar | H04L 47/14 370/345 |
| 2010/0329204 A1* | 12/2010 | Guo | H04W 72/1278 370/329 |
| 2011/0085566 A1* | 4/2011 | Bucknell | H04L 47/10 370/412 |
| 2011/0170495 A1 | 7/2011 | Earnshaw et al. | |
| 2013/0322236 A1* | 12/2013 | Bahadur | H04L 12/4633 370/230 |
| 2014/0119230 A1 | 5/2014 | Huey et al. | |
| 2016/0044530 A1* | 2/2016 | Cheng | H04W 28/0289 370/235 |
| 2016/0255541 A1* | 9/2016 | Altman | H04W 28/0289 370/236 |
| 2016/0323762 A1* | 11/2016 | Adachi | H04W 16/18 |

\* cited by examiner (a) Control-Plane Protocol Stack (b) User-Plane Protocol Stack

METHOD FOR PERFORMING UPLINK PACKET MEASUREMENTS IN A WIRELESS COMMUNICATION SYSTEM AND A DEVICE THEREFOR

This application is the National Phase of PCT International Application No. PCT/KR2016/007824, filed on Jul. 19, 2016, which claims priorities under 35 U.S.C. 119(e) to U.S. Provisional Application No. 62/202,899, filed on Aug. 9, 2015, and 62/195,274, filed Jul. 21, 2015 which are hereby incorporated by reference herein in their entirety.

TECHNICAL FIELD

The present invention relates to a wireless communication system and, more particularly, to a method for performing uplink (UL) packet measurements in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing UL packet measurements in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In order to report measurement in Minimization of Drive Tests (MDT) efficiently, it is invented that the UE performs UL packet measurements per logical channel priority (LCP) and reports the UL packet measurements per LCP to an eNB.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
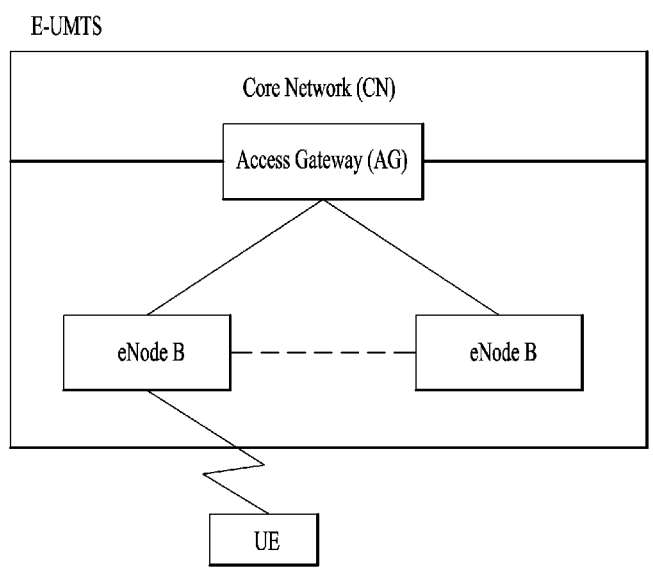
FIG. 1 is a diagram showing a network structure of an Evolved Universal Mobile Telecommunications System (E-UMTS) as an example of a wireless communication system.
Figure 2A:
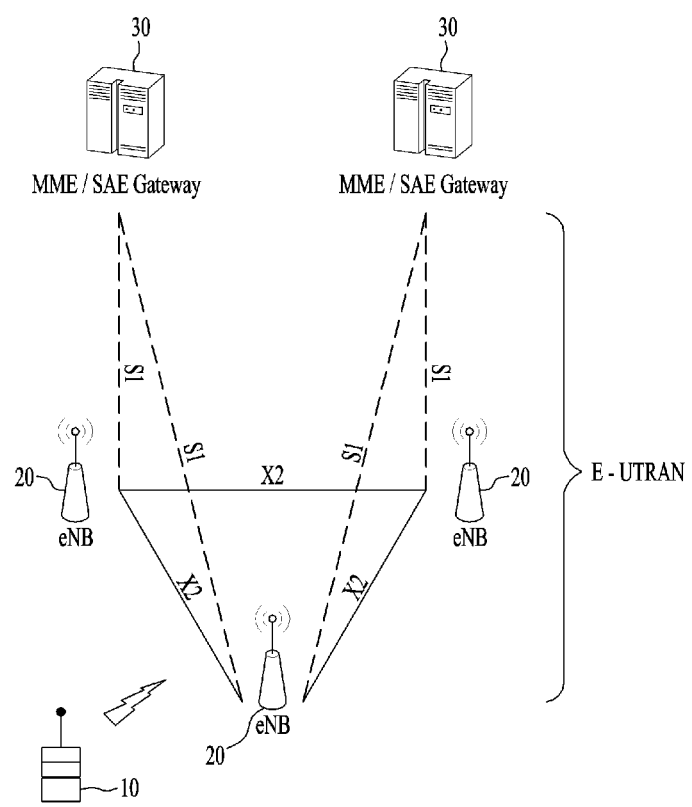
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
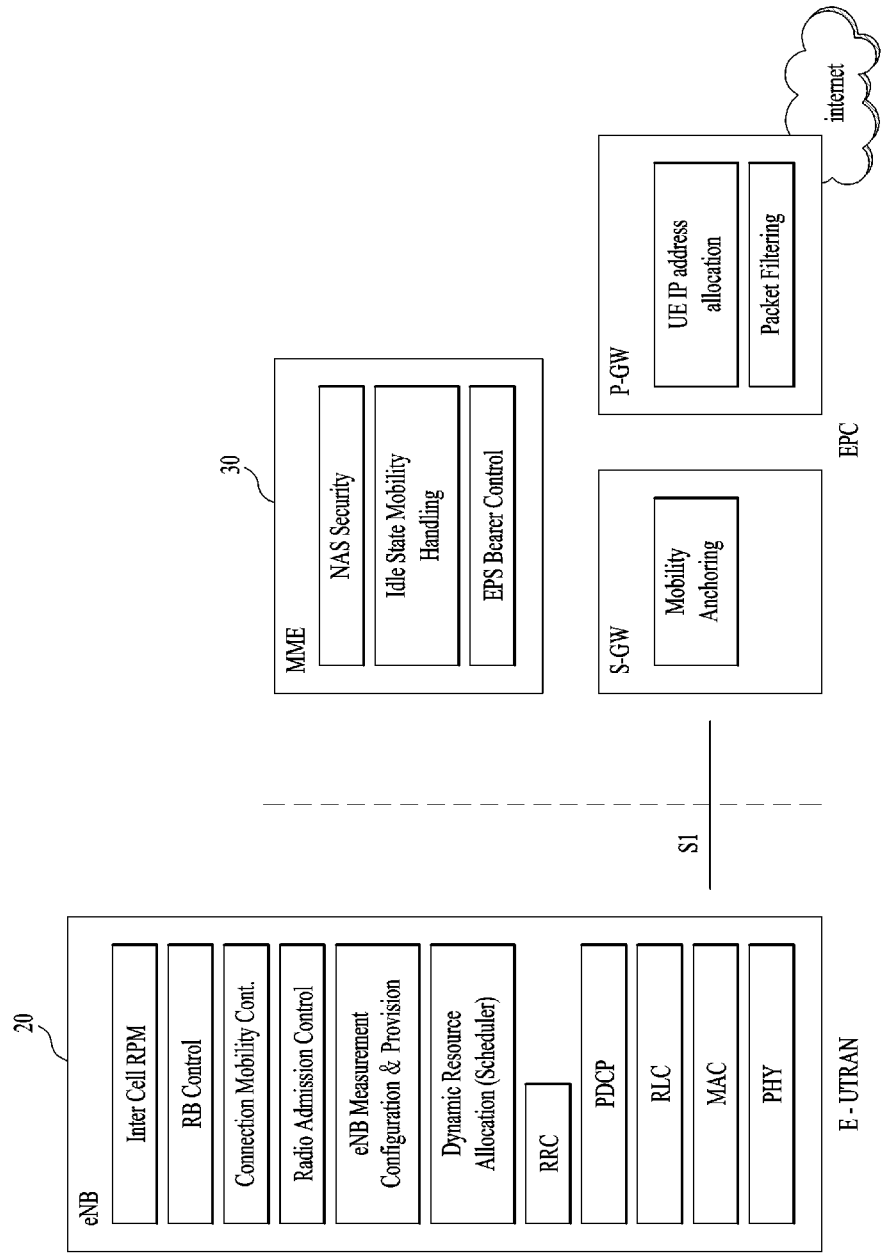
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
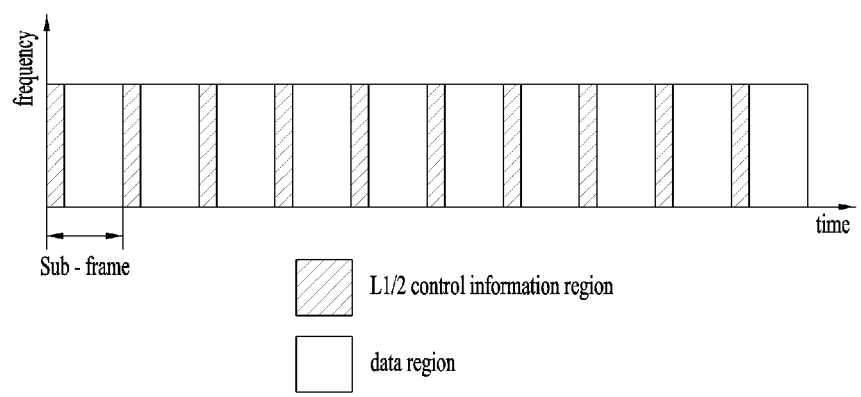
FIG. 3 is a view showing an example of a physical channel structure used in an E-UMTS system.

FIG. 3 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 3, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 4:
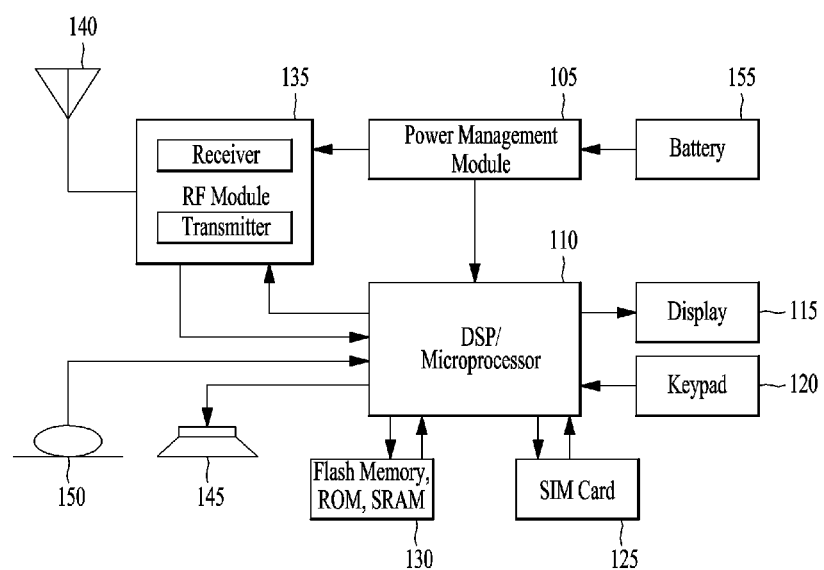
FIG. 4 is a block diagram of a communication apparatus according to an embodiment of the present invention.

FIG. 4 is a block diagram of a communication apparatus according to an embodiment of the present invention.

The apparatus shown in FIG. 4 can be a user equipment (UE) and/or eNB adapted to perform the above mechanism, but it can be any apparatus for performing the same operation.

As shown in FIG. 4, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 4 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 4 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 5:
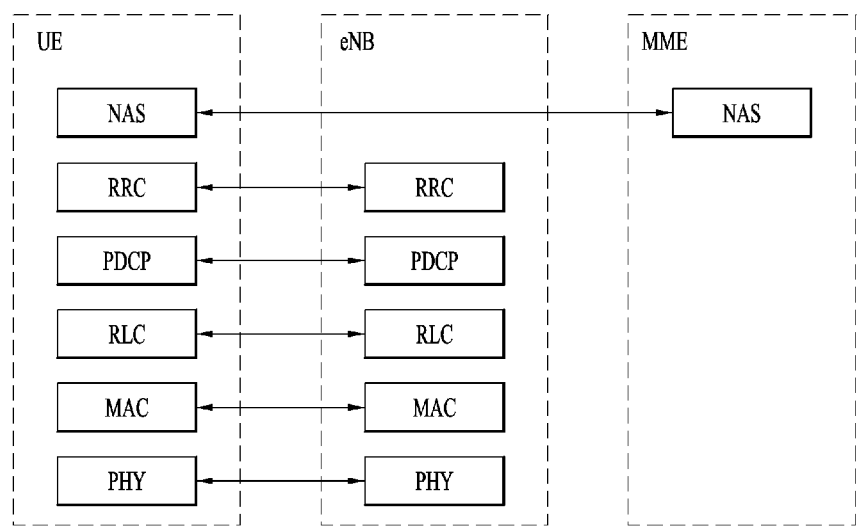
FIG. 5 is a diagram showing a control plane and a user plane of a radio interface protocol between a UE and an E-UTRAN based on a 3rd generation partnership project (3GPP) radio access network standard.
Figure 5:
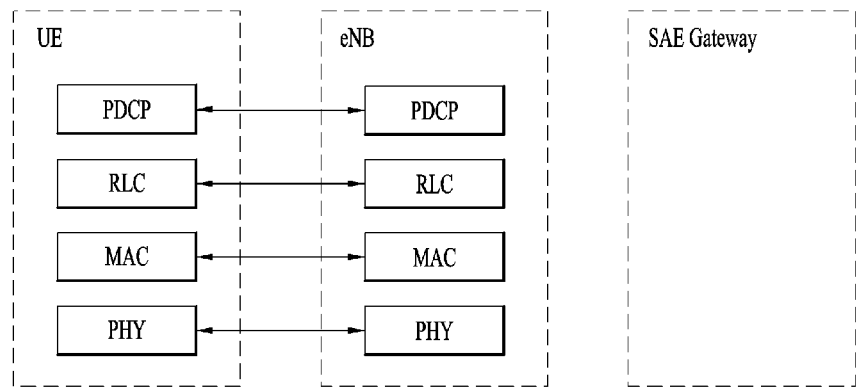

FIG. 5 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 6:
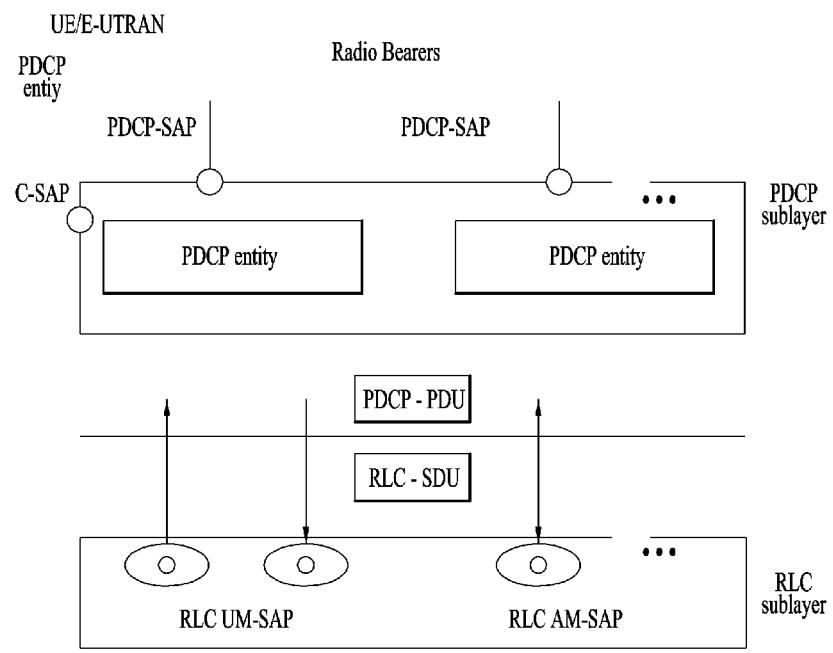
FIG. 6 is a conceptual diagram for a PDCP entity architecture.

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

Figure 7:
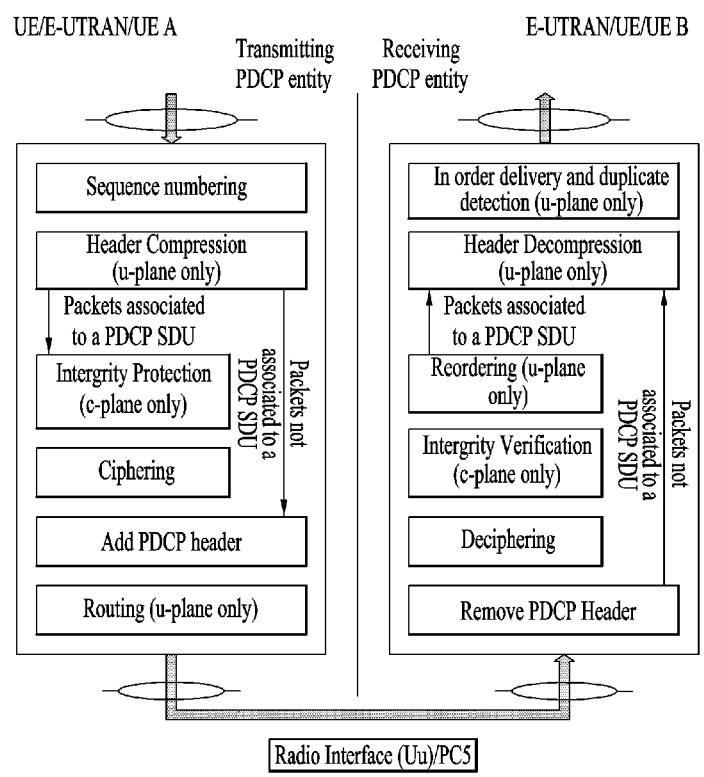
FIG. 7 is a conceptual diagram for functional view of a PDCP entity.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer; it should not restrict implementation. The figure is based on the radio interface protocol architecture.

At reception of a PDCP service data unit (SDU) from upper layers, the UE may start a discardTimer associated with this PDCP SDU. A transmitting side of each PDCP entity for DRBs may maintain the discardTimer. The duration of the discardTimer is configured by upper layers. In the transmitter, a new timer is started upon reception of a PDCP SDU from an upper layer. For a PDCP SDU received from upper layers, the UE may associate the PDCP sequence number (SN) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer. If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

Figure 8:
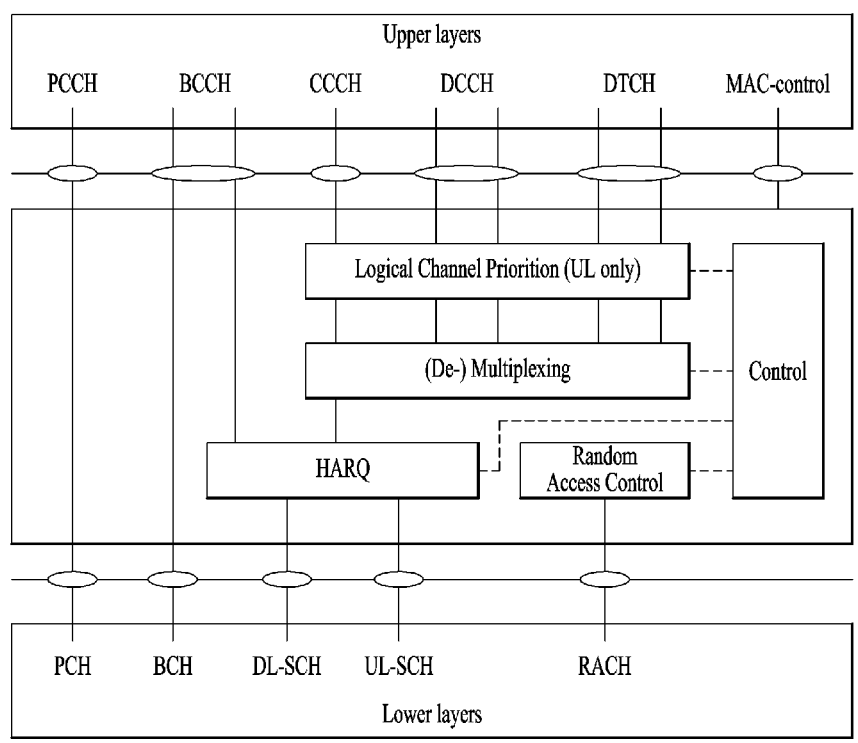
FIG. 8 is a diagram for MAC structure overview in a UE side.

FIG. 8 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. The MAC entity shall perform Logical Channel Prioritization procedure when a new transmission is performed.

Meanwhile, to allow a scheduler to determine the amount of resources to grant to each terminal in future subframes, information about the buffer situation is useful.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of DAT in the UL buffers of the UE. RRC may control BSR reporting by configuring the three timers periodicBSR-Timer and retxBSR-Timer and logicalChannelSR-Prohibit-Timer and by, for each logical channel, optionally signaling Logical Channel Group (LCG) which allocates the logical channel to an LCG.

A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

Figure 9A:
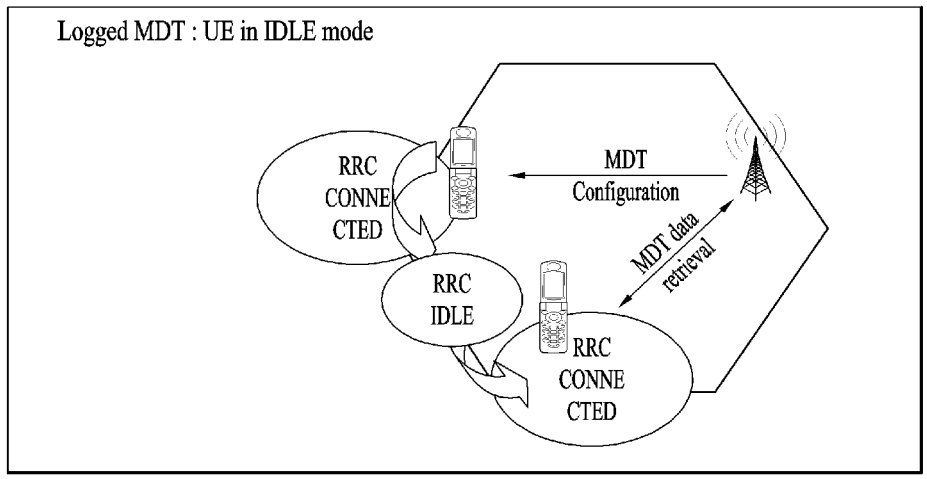
FIG. 9A is a conceptual diagram for Logged MDT.
Figure 9B:
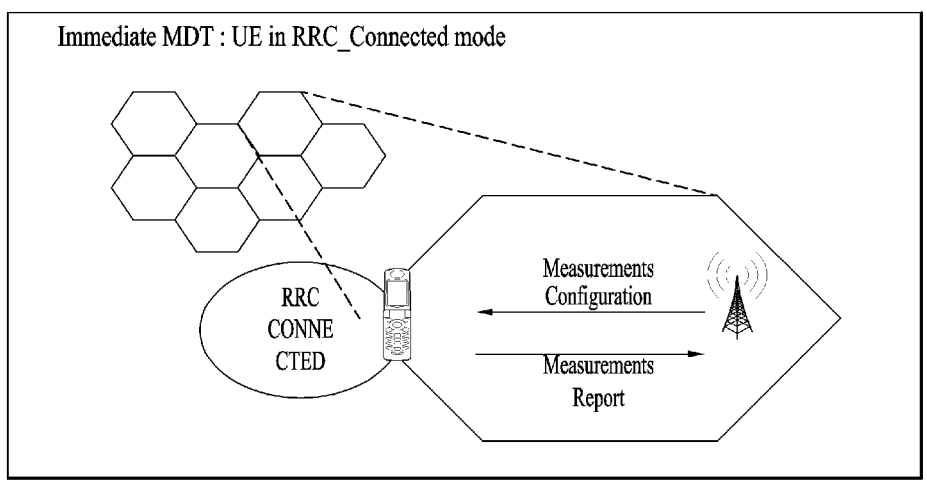
FIG. 9B is a conceptual diagram for Immediate MDT.

FIG. 9A is a conceptual diagram for Logged MDT, and FIG. 9B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/radio network controller (RNC) available at the time of reporting condition as well as measurements by the network for MDT purposes. The Logged MDT is a MDT functionality involving measurement logging by UE in IDLE mode, CELL_paging channel (CELL_PCH), UTRAN registration area_PCH (URA_PCH) states and CELL_forward access channel (CELL_FACH) state when second DRX cycle is used (when UE is in UTRA) for reporting to eNB/RNC at a later point in time, and logging of MBSFN measurements by E-UTRA UE in IDLE and CONNECTED modes.

MDT measurements may include packet delay measurement, packet discard rate measurement, and packet loss rate measurement.

Packet Delay in DL per QCI refers to packet delay for DRBs. The objective of this measurement is to measure L2 Packet Delay for operations and maintenance (OAM) performance observability or for QoS verification of MDT. For arrival of packets the reference point is PDCP upper service access point (SAP). For successful reception the reference point is MAC lower SAP. The Detailed Definition and explanations of the Packet Delay in DL per QCI can be found in Equation 1 and Table 1 below.

$$M(T, qci) = \left\lfloor \frac{\sum_{\forall i} tAck(i) - tArriv(i)}{I(T)} \right\rfloor \quad \text{[Equation 1]}$$

TABLE 1

| | |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

Packet Discard Rate in DL per QCI refers to discard for DRBs. The objective of this measurement is to measure packets that are dropped due to congestion, traffic management etc, for OAM performance observability. One packet corresponds to one PDCP SDU. The reference point is PDCP upper SAP. The Detailed Definition and explanations of the Packet Discard Rate in DL per QCI can be found in Equation 2 and Table 2 below.

$$M(T, qci) = \left\lfloor \frac{Ddisc(T, qci) * 1000000}{N(T, qci)} \right\rfloor \quad \text{[Equation 2]}$$

TABLE 2

| | |
|---|---|
| M(T, qci) | Packet Discard Rate in the DL per QCI, averaged during time period T. Unit: number of discarded packets per received packets * $10^6$, Integer. |
| Ddisc(T, qci) | Number of DL packets, for which no part has been transmitted over the air, of a data radio bearer with QCI = qci, that are discarded during time period T in the PDCP, RLC or MAC layers due to reasons other than hand-over. |
| N(T, qci) | Number of DL packets of bearer with QCI = qci that has entered PDCP upper SAP during time period T (NOTE). |
| T | Time Period during which the measurement is performed, Unit: minutes (NOTE). |

It is noted that packet loss is expected to be small or very small. The statistical accuracy of an individual discard rate measurement result is dependent on how many packets has been received, and thus the time for the measurement.

Packet Uu Loss Rate in DL per QCI refers to packet loss for DRBs. The objective of this measurement is to measure packets that are lost at Uu transmission, for OAM performance observability. One packet corresponds to one PDCP SDU. The Detailed Definition and explanations of the Packet Uu Loss Rate in DL per QCI can be found in Equation 3 and Table 3 below.

$$M(T, qci) = \left\lfloor \frac{Dloss(T, qci) * 1000000}{N(T, qci) + Dloss(T, qci)} \right\rfloor \quad \text{[Equation 3]}$$

TABLE 3

| | |
|---|---|
| M(T, qci) | Packet Uu Loss Rate in the DL per QCI. Unit: number of lost packets per transmitted packets * $10^6$, Integer. |
| Dloss(T, qci) | Number of DL packets, of a data radio bearer with QCI = qci, for which at least a part has been transmitted over the air but not positively acknowledged, and it was decided during time period T that no more transmission attempts will be done. If transmission of a packet might continue in another cell, it shall not be included in this count. |
| N(T, qci) | Number of DL packets, of a data radio bearer with QCI = qci, which has been transmitted over the air and positively acknowledged during time period T. |
| T | Time Period during which the measurement is performed, Unit: minutes (NOTE). |

It is noted that packet loss is expected to be upper bounded by the Packet Error Loss Rate (PELR) of the QCI which takes values between $10^{-6}$ and $10^{-2}$. The statistical accuracy of an individual packet loss rate measurement result is dependent on how many packets have been received, and thus the time for the measurement.

Packet Loss Rate in UL per QCI refers to packet loss for DRBs. The objective of this measurement is to measure packets that are lost in the UL, for OAM performance observability. One packet corresponds to one PDCP SDU. Reference point is the PDCP upper SAP. The Detailed Definition and explanations of the Packet Loss Rate in UL per QCI can be found in Equation 4 and Table 4 below.

$$M(T, qci) = \left\lfloor \frac{Dloss(T, qci) * 1000000}{N(T, qci)} \right\rfloor \quad \text{[Equation 4]}$$

TABLE 4

| | |
|---|---|
| M(T, qci) | Packet Loss Rate in the UL per QCI. Unit: number of lost packets per transmitted packets * $10^6$, Integer. |
| Dloss(T, qci) | Number of missing UL PDCP sequence numbers, representing packets that are not delivered to higher layers, of a data radio bearer with QCI = qci during time period T. If transmission of a packet might continue in another cell, it shall not be included in this count. |
| N(T, qci) | Total number of UL PDCP sequence numbers (also including missing sequence numbers) of a bearer with QCI = qci, starting from the sequence number of the first packet delivered by PDCP upper SAP to higher layers until the sequence number of the last packet during time period T. |
| T | Time Period during which the measurement is performed, Unit: minutes (NOTE). |

It is noted that packet loss is expected to be upper bounded by the PELR of the QCI which takes values between $10^{-6}$ and $10^{-2}$. The statistical accuracy of an individual packet loss rate measurement result is dependent on how many packets have been received, and thus the time for the measurement.

Meanwhile, measurements in MDT, such as measurements discussed above, are performed separately per QoS Class Identifier (QCI). QCI defines a Quality of Service (QoS) level for a radio bearer so that the radio bearers with the same QCI would be treated in a similar way regardless of manufacturers/operators. More detailed explanations of QCI will be described with reference to FIGS. 10A and 10B.

Figure 10A:
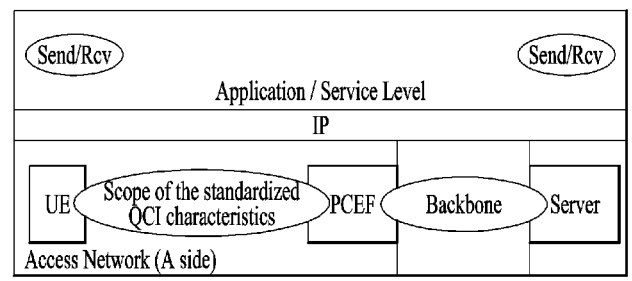
FIG. 10A shows scope of the Standardized QCI characteristics for client/server communication.
Figure 10B:
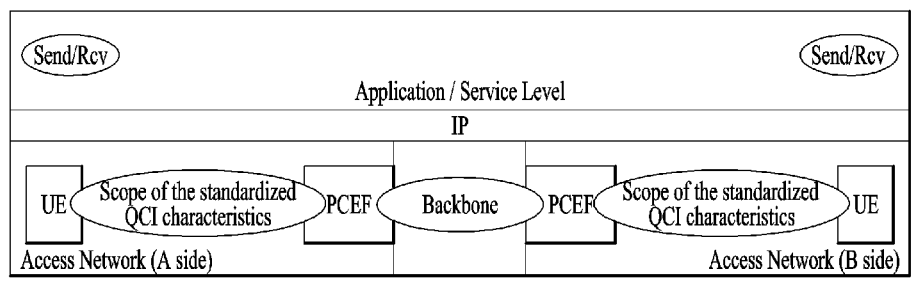
FIG. 10B shows scope of the Standardized QCI characteristics for peer/peer communication.

FIG. 10A shows scope of the Standardized QCI characteristics for client/server communication, and FIG. 10B shows scope of the Standardized QCI characteristics for peer/peer communication.

Standardized characteristics associated with standardized QCI values are specified. The characteristics describe the packet forwarding treatment that a service data flow (SDF) aggregate receives edge-to-edge between the UE and the Policy and Charging Enforcement Function (PCEF) (as shown in FIGS. 10A and 10B) in terms of the following performance characteristics: i) Resource Type (guaranteed bit rate (GBR) or Non-GBR); ii) Priority; iii) Packet Delay Budget; and iv) Packet Error Loss Rate.

Here, a GBR bearer means an IP connectivity access network (CAN) bearer with reserved (guaranteed) bitrate resources, and a non-GBR bearer means an IP CAN bearer with no reserved (guaranteed) bitrate resources.

The standardized characteristics are not signalled on any interface. They should be understood as guidelines for the pre-configuration of node specific parameters for each QCI. The goal of standardizing a QCI with corresponding characteristics is to ensure that applications/services mapped to that QCI receive the same minimum level of QoS in multi-vendor network deployments and in case of roaming A standardized QCI and corresponding characteristics is independent of the UE's current access (3GPP or Non-3GPP). The one-to-one mapping of standardized QCI values to standardized characteristics is captured in table 5 below.

TABLE 5

| QCI | Resource Type | Priority Level | Packet Delay Budget | Packet Error Loss Rate (NOTE 2) | Example Services |
|---|---|---|---|---|---|
| 1 (NOTE 3) | GBR | 2 | 100 ms (NOTE 1, NOTE 11), | $10^{-2}$ | Conversational Voice |
| 2 (NOTE 3) | | 4 | 150 ms (NOTE 1, NOTE 11) | $10^{-3}$ | Conversational Video (Live Streaming) |
| 3 (NOTE 3) | | 3 | 50 ms (NOTE 1, NOTE 11) | $10^{-3}$ | Real Time Gaming |
| 4 (NOTE 3) | | 5 | 300 ms (NOTE 1, NOTE 11) | $10^{-6}$ | Non-Conversational Video (Buffered Streaming) |
| 65 (NOTE 3, NOTE 9) | | 0.7 | 75 ms (NOTE 7, NOTE 8) | $10^{-2}$ | Mission Critical user plane Push To Talk voice (e.g., MCPTT) |
| 66 (NOTE 3) | | 2 | 100 ms (NOTE 1, NOTE 10) | $10^{-2}$ | Non-Mission-Critical user plane Push To Talk voice |
| 5 (NOTE 3) | Non-GBR | 1 | 100 ms (NOTE 1, NOTE 10) | $10^{-6}$ | IMS Signalling |
| 6 (NOTE 4) | | 6 | 300 ms (NOTE 1, NOTE 10) | $10^{-6}$ | Video (Buffered Streaming) TCP-based (e.g., www, e-mail, chat, ftp, p2p file sharing, progressive video, etc.) |
| 7 (NOTE 3) | | 7 | 100 ms (NOTE 1, NOTE 10) | $10^{-3}$ | Voice, Video (Live Streaming) Interactive Gaming |
| 8 (NOTE 5) | | 8 | 300 ms (NOTE 1) | $10^{-6}$ | Video (Buffered Streaming) TCP-based (e.g., www, e-mail, chat, ftp, p2p file sharing, progressive video, etc.) |
| 9 (NOTE 6) | | 9 | | | |
| 69 (NOTE 3, NOTE 9) | | 0.5 | 60 ms (NOTE 7, NOTE 8) | $10^{-6}$ | Mission Critical delay sensitive signalling (e.g., MC-PTT signalling) |

TABLE 5-continued

| QCI | Resource Type | Priority Level | Packet Delay Budget | Packet Error Loss Rate (NOTE 2) | Example Services |
|---|---|---|---|---|---|
| 70 (NOTE 4) | | 5.5 | 200 ms (NOTE 7, NOTE 10) | $10^{-6}$ | Mission Critical Data (e.g. example services are the same as QCI 6/8/9) |

More specific description regarding Table 5 is specified in TS 23.203 version 13.4.0.

Meanwhile, as discussed above, measurements in MDT such as packet delay measurement, packet discard rate measurement, and packet loss rate measurement discussed above are performed separately per QCI.

However, a UE does not receive any QCI related configuration from an eNB. When the eNB establishes at least one or more radio bearers to provide user plane service, the UE is configured with a dedicated radio resource configuration in a RRC message (e.g., RRCConnectionReconfiguration message, wherein the RRCConnectionReconfiguration is the command to modify an RRC connection, and may convey information for measurement configuration, mobility control, and radio resource configuration).

Table 6 shows RadioResourceConfigDedicated information element (IE) included in the RRCConnectionReconfiguration message, and Table 7 shows LogicalChannelConfig IE included in the RadioResourceConfigDedicated IE. The RadioResourceConfigDedicated IE in Table 6 is used to setup/modify/release RBs, to modify the MAC main configuration, to modify the SPS configuration and to modify dedicated physical configuration. The LogicalChannelConfig IE in Table 7 is used to configure the logical channel parameters.

Each field in Tables 6 and 7 is specified in TS 36.331 version 12.6.0. For example, in Table 6, logicalChannelConfig is used to indicate whether the logical channel configuration is signalled explicitly or set to the default logical channel configuration for SRB1 or SRB2. logicalChannelIdentity indicates a logical channel identity for both UL and DL. In Table 7, logicalChannelGroup is for mapping of logical channel to logical channel group for BSR reporting. Priority indicates Logical channel priority in TS 36.321 version 12.5.0.

TABLE 6

RadioResourceConfigDedicated information element

```
-- ASN1START
RadioResourceConfigDedicated ::=        SEQUENCE {
    srb-ToAddModList                    SRB-ToAddModList                        OPTIONAL,       -- Cond HO-Conn
    drb-ToAddModList                    DRB-ToAddModList                        OPTIONAL,       -- Cond HO-
                                                                                                   toEUTRA
    drb-ToReleaseList                   DRB-ToReleaseList                       OPTIONAL,       -- Need ON
    mac-MainConfig                      CHOICE {
        explicitValue                       MAC-MainConfig,
        defaultValue                        NULL
    }                                                                           OPTIONAL,       -- Cond HO-
                                                                                                   toEUTRA2
    sps-Config                          SPS-Config                              OPTIONAL,       -- Need ON
    physicalConfigDedicated             PhysicalConfigDedicated                 OPTIONAL,       -- Need ON
    ...,
    [[ rlf-TimersAndConstants-r9        RLF-TimersAndConstants-r9               OPTIONAL        -- Need ON
    ]],
    [[ measSubframePatternPCell-r10     MeasSubframePatternPCell-r10            OPTIONAL        -- Need ON
    ]],
    [[ neighCellsCRS-Info-r11           NeighCellsCRS-Info-r11                  OPTIONAL        -- Need ON
    ]],
    [[ naics-Info-r12                   NAICS-AssistanceInfo-r12                OPTIONAL        -- Need ON
    ]] }
RadioResourceConfigDedicatedPSCell-r12 ::=  SEQUENCE {
    -- UE specific configuration extensions applicable for an PSCell
    physicalConfigDedicatedPSCell-r12       PhysicalConfigDedicated             OPTIONAL,       -- Need ON
    sps-Config-r12                          SPS-Config                          OPTIONAL,       -- Need ON
    naics-Info-r12                          NAICS-AssistanceInfo-r12            OPTIONAL,       -- Need ON
    ...
}
RadioResourceConfigDedicatedSCG-r12 ::=  SEQUENCE {
    drb-ToAddModListSCG-r12             DRB-ToAddModListSCG-r12                 OPTIONAL,       -- Need On
    mac-MainConfigSCG-r12               MAC-MainConfig                          OPTIONAL,       -- Need ON
    rlf-TimersAndConstantsSCG-r12       RLF-TimersAndConstantsSCG-r12           OPTIONAL,       -- Need ON
    ...
}
RadioResourceConfigDedicatedSCell-r10 ::=  SEQUENCE {
    -- UE specific configuration extensions applicable for an SCell
    physicalConfigDedicatedSCell-r10        PhysicalConfigDedicatedSCell-r10    OPTIONAL,       -- Need ON
    ...,
    [[ mac-MainConfigSCell-r11              MAC-MainConfigSCell-r11             OPTIONAL        -- Cond SCellAdd
    ]],
```

TABLE 6-continued

RadioResourceConfigDedicated information element

| | | | |
|---|---|---|---|
| [ [ naics-Info-r12 | NAICS-AssistanceInfo-r12 | OPTIONAL | -- Need ON |
| ] ] | | | |
| } | | | |
| SRB-ToAddModList : := | SEQUENCE (SIZE (1 . . 2) ) OF SRB-ToAddMod | | |
| SRB-ToAddMod : :=    SEQUENCE { | | | |
|   srb-Identity | INTEGER (1 . . 2) , | | |
|   rlc-Config | CHOICE { | | |
|     explicitValue | RLC-Config, | | |
|     defaultValue | NULL | | |
|   }    OPTIONAL, | | | -- Cond Setup |
|   logicalChannelConfig | CHOICE { | | |
|     explicitValue | LogicalChannelConfig, | | |
|     defaultValue | NULL | | |
|   }    OPTIONAL, | | | -- Cond Setup |
|   ... | | | |
| } | | | |
| DRB-ToAddModList : := | SEQUENCE (SIZE (1 . .maxDRB) ) OF DRB-ToAddMod | | |
| DRB-ToAddModListSCG-r12 : := | SEQUENCE (SIZE (1 . .maxDRB) ) OF DRB-ToAddModSCG-r12 | | |
| DRB-ToAddMod : :=    SEQUENCE { | | | |
|   eps-BearerIdentity | INTEGER (0 . . 15) | OPTIONAL, | -- Cond DRB-Setup |
|   drb-Identity | DRB-Identity, | | |
|   pdcp-Config | PDCP-Config | OPTIONAL, | -- Cond PDCP |
|   rlc-Config | RLC-Config | OPTIONAL, | -- Cond SetupM |
|   logicalChannelIdentity | INTEGER (3 . . 10) | OPTIONAL, | -- Cond DRB-SetupM |
|   logicalChannelConfig | LogicalChannelConfig | OPTIONAL, | -- Cond SetupM |
|   ..., | | | |
|   [ [ drb-TypeChange-r12 | ENUMERATED {toMCG} | OPTIONAL, | -- Need OP |
|     rlc-Config-v1250 | RLC-Config-v1250 | OPTIONAL | -- Need ON |
|   ] ] | | | |
| } | | | |
| DRB-ToAddModSCG-r12 : :- SEQUENCE { | | | |
|   drb-Identity-r12 | DRB-Identity, | | |
|   drb-Type-r12 | CHOICE { | | |
|     split-r12 | NULL, | | |
|     scg-r12 | SEQUENCE { | | |
|       eps-BearerIdentity-r12 | INTEGER (0 . . 15) | OPTIONAL, | -- Cond DRB-Setup |
|       pdcp-Config-r12 | PDCP-Config | OPTIONAL | -- Cond PDCP-S |
|     } | | | |
|   } | | OPTIONAL, | -- Cond SetupS2 |
|   rlc-ConfigSCC-r12 | RLC-Config | OPTIONAL, | -- Cond SetupS |
|   rlc-Config-v1250 | RLC-Config-v1250 | OPTIONAL, | -- Need ON |
|   logicalChannelIdentitySCG-r12 | INTEGER (3 . . 10) | OPTIONAL, | -- Cond DRB-SetupS |
|   logicalChannelConfigSCG-r12 | LogicalChannelConfig | OPTIONAL, | -- Cond SetupS |
|   ... | | | |
| } | | | |
| DRB-ToReleaseList : := | SEQUENCE (SIZE (1 . .maxDRB) ) OF DRB-Identity | | |
| MeasSubframePatternPCell-r10 : := | CHOICE { | | |
|   release | NULL, | | |
|   setup | MeasSubframePattern-r10 | | |
| } | | | |
| NeighCellsCRS-Info-r11 : := | CHOICE { | | |
|   release | NULL, | | |
|   setup | CRS-AssistanceInfoList-r11 | | |
| } | | | |
| CRS-AssistanceInfoList-r11 : := SEQUENCE (SIZE (1 . .maxCellReport) ) OF CRS-AssistanceInfo-r11 | | | |
| CRS-AssistanceInfo-r11 : := SEQUENCE { | | | |
|   physCellId-r11 | PhysCellId, | | |
|   antennaPortsCount-r11 | ENUMERATED {an1, an2, an4, spare1}, | | |
|   mbsfn-SubframeConfigList-r11 | MBSFN-SubframeConfigList, | | |
|   ... | | | |
| } | | | |
| NAICS-AssistanceInfo-r12 : := | CHOICE { | | |
|   release | NULL, | | |
|   setup | SEQUENCE { | | |
|     neighCellsToReleaseList-r12 | NeighCellsToReleaseList-r12 | OPTIONAL, | -- Need ON |
|     neighCellsToAddModList-r12 | NeighCellsToAddModList-r12 | OPTIONAL, | -- Need ON |
|     servCellp-a-r12 | P-a | OPTIONAL | -- Need ON |
|   } | | | |
| } | | | |
| NeighCellsToReleaseList-r12 : := | SEQUENCE (SIZE (1 . .maxNeighCell-r12) ) OF PhysCellId | | |
| NeighCellsToAddModList-r12 : := SEQUENCE (SIZE (1 . .maxNeighCell-r12) ) OF NeighCellsInfo-r12 | | | |
| NeighCellsInfo-r12 : := | SEQUENCE { | | |
|   physCellId-r12 | PhysCellId, | | |
|   p-b-r12 | INTEGER (0 . .3), | | |
|   crs-PortsCount-r12 | ENUMERATED {n1, n2, n4, spare}, | | |
|   mbsfn-SubframeConfig-r12 | MBSFN-SubframeConfigLost | OPTIONAL, | -- Need ON |
|   p-aList-r12 | SEQUENCE (SIZE (1 . .maxP-a-PerNeighCell-r12) ) OF P-a, | | |
|   transmissionModeList-r12 | BIT STRING (SIZE(8) ), | | |

TABLE 6-continued

RadioResourceConfigDedicated information element

```
    resAllocGranularity-r12         INTEGER (1 . . 4),
    . . .
}
P-a : := ENUMERATED {  dB-6, dB-4dot77, dB-3, dB-1dot77,
                                     dB0, dB1, dB2, dB3}
-- ASN1STOP
```

TABLE 7

LogicalChannelConfig information element

```
-- ASN1START
LogicalChannelConfig : :=       SEQUENCE {
    ul-SpecificParameters           SEQUENCE {
        priority                        INTEGER (1 . . 16),
        prioritisedBitRate              ENUMERATED {
                                            kBps0, kBps8, kBps16, kBps32, kBp64, kBs128,
                                            kBps256, infinity, kBps512-v1020, kBps1024-v1020,
                                            kBp62048-v1020, spare5, spare4, spare3, spare2,
                                            spare1},
        bucketSizeDuration              ENUMERATED {
                                            ms50, ms100, ms150, ms300, ms500, ms1000, spare2,
                                            spare1},
        logicalChannelGroup             INTEGER (0 . . 3)      OPTIONAL       -- Need OR
    }       OPTIONAL,                                                          -- Cond UL
    . . . ,
    [[ logicalChannelSR-Mask-r9     ENUMERATED {setup} OPTIONAL  -- Cond SRMask
    ]],
    [[ logicalChannelSR-Prohibit-r12   BOOLEAN           OPTIONAL  -- Need ON
    ]]
]
-- ASN1STOP
```

As shown in Tables 6 and 7, there is no information about QCI field in RRC message, and the UE is not configured with the QCI of corresponding bearer. Thus, it is impossible for the UE to report an UL packet delay measurement and an UL packet discard rate measurement per QCI to the eNB. Therefore, new criteria of reporting the UL packet delay measurement and the UL packet discard measurement needs to be defined.

In order to report measurement in MDT, it is invented that when a UE reports UL packet measurements (e.g. UL packet delay measurement and UL packet discard rate measurement) to the eNB, the UE reports the UL Packet Measurement Report per logical channel priority (LCP). UL packet delay measurement per LCP and UL packet discard rate measurement per LCP will be described in FIGS. 11 and 12 respectively.

Figure 11:
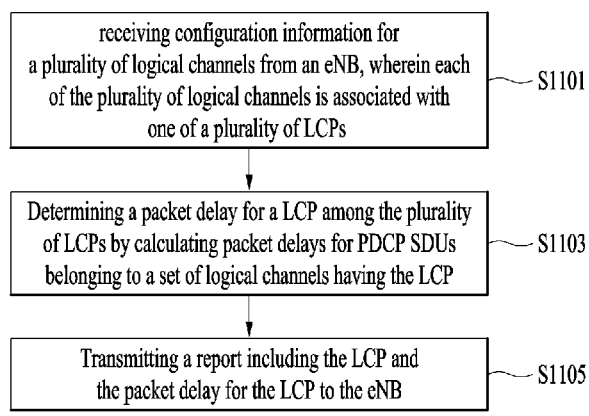
FIG. 11 is conceptual diagram for performing an UL packet delay measurement per LCP according to an exemplary embodiment of the present invention.

FIG. 11 is conceptual diagram for performing an UL packet delay measurement per LCP according to an exemplary embodiment of the present invention.

It is invented that the UE performs UL packet delay measurement per logical channel priority (LCP) and reports the UL packet delay measurement per LCP to an eNB. In detail, when the UE reports the UL packet delay measurement to the eNB, the UE transmits UL packet delay measurement report by including a LCP and the corresponding UL packet delay measurement result.

In the present exemplary embodiment, it is assumed that a UE is configured by an eNB with multiple logical channels which have a LCP for each logical channel.

A packet delay for per LCG may be determined based on packet delays for PDCP SDUs. For calculating packet delay for each PDCP SDU, the UE logs a time point (hereinafter, TP_PDCP) when a PDCP SDU of a logical channel arrives at PDCP upper service access point (SAP) and a time point (hereinafter, TP_MAC) when a first segment of the PDCP SDU arrives at MAC layer.

The UE may log TP_PDCP and TP_MAC for each PDCP SDU within a certain time period (i.e., logging duration). The logging duration may be defined as a number of subframes, radio frames, or seconds. The logging duration may be configured by a network.

The UE may log TP_PDCP and TP_MAC for a specific PDCP SDU if the specific PDCP SDU arrives in PDCP upper SAP within the logging duration. Or, the UE may log TP_PDCP and TP_MAC for a specific PDCP SDU if the specific PDCP SDU arrives in PDCP upper SAP within the logging duration and the first segment of the specific PDCP SDU is arrived in MAC layer within the logging duration.

Within the logging duration, the UE may perform logging for i) all PDCP SDUs, ii) every N-th PDCP SDU, iii) PDCP SDU(s) whose size is equal to or larger than specific bytes (e.g., X bytes), or iv) PDCP SDU(s) whose size is equal to or less than specific bytes (e.g., Y bytes).

After logging, the UE performs UL packet delay measurement per LCP. That is, the UE determines UL packet delay per LCP by using results of the logging.

For each of LCPs, by using TP_PDCPs and TP_MACs of PDCP SDUs which are data from logical channels that have the same LCP, the UE calculates a time difference (hereinafter, TP_DIFF) between TP_PDCP and TP_MAC (i.e., a TP_DIFF=TP_MAC−TP_PDCP) for each of the PDCP SDUs from logical channels that have the same LCP. After that, the UE calculates an average of TP_DIFFs for a LCP, by dividing the summation of TP_DIFFs by number of the PDCP SDUs from logical channels that have the LCP within the logging duration. The UE considers the average of TP_DIFFs for the LCP as an UL packet delay measurement of the LCP. The UE may perform above UL packet delay measurement at the end of the logging duration.

After performing the UL packet delay measurement per LCP, the UE reports results of the UL packet delay measurement per LCP to the eNB. An UL Packet Delay Measurement Report may include at least one set of followings: i) a LCP and ii) a result of an UL packet delay measurement of the LCP (i.e., the average of TP_DIFFs for the LCP).

If the UE reports UL packet delay measurement reports for multiple LCPs, the UE may transmit multiple UL packet delay measurement reports, and each of the multiple UL packet delay measurement reports includes one LCP and a corresponding result of an UL packet delay measurement. Or, the UE may transmit one UL packet delay measurement report including multiple LCPs and corresponding results of UL packet delay measurements.

Preferably, the UE may transmit UL packet delay measurement report at the end of the logging duration. Or, the UE may transmit UL packet delay measurement report when the UE receives a command from the eNB to transmit the UL packet delay measurement report.

The UE may transmit UL packet delay measurement report to the eNB by using one of RRC/PDCP/RLC/MAC/PHY signalling.

In some embodiments, the UE can measure UL packet delay for logical channels which have same LCP and same QCI. In this case, an UL packet delay measurement report may include at least one set of followings: i) a LCP, ii) a QCI, and iii) an averaged result of UL packet delay measurements per LCP which has the QCI.

In some embodiments, the UE can be configured to log/measure/report UL packet delay for a certain LCP by the eNB. For this, the UE may receive a command from the eNB including a certain LCP for which the UE will log/measure/report UL packet delay. The command can be received via one of RRC/PDCP/RLC/MAC/PHY signalling.

Referring to FIG. 11, the UE receives configuration information for a plurality of logical channels from an eNB (S1101). Each of the plurality of logical channels is associated with one of a plurality of LCPs.

The UE performs UL packet delay measurement per LCP. For each LCP, the UE determines a packet delay for a LCP among the plurality of LCPs by calculating packet delays for PDCP SDUs belonging to a set of logical channels having the LCP (S1103). The packet delay for the LCP can be determined by averaging the packet delays for the PDCP SDUs received from an upper layer during a certain time period.

Meanwhile, packet delay for a PDCP SDU among the PDCP SDUs is calculated by logging a first time point when the PDCP SDU is received at a PDCP entity from the upper layer, logging a second time point when a first segment of the PDCP SDU is delivered to a MAC entity, and calculating the packet delay for the PDCP SDU by subtracting the first time point from the second time point. The packet delays for the PDCP SDUs are calculated during a certain time period.

After performing the UL packet delay measurement, the UE transmits a report including the LCP and the packet delay for the LCP to a network (S1105).

In some embodiments, the UE may receive a command to transmit the report from the network, and the report is transmitted when the command is received.

Meanwhile, the report can include multiple LCPs and corresponding multiple packet delays. That is, the report can further includes the another LCP and the packet delay for the another LCP. For this, the UE may determine a packet delay for another LCP by calculating packet delays for PDCP SDUs belonging to another set of logical channels having the another LCP.

As discussed above, similar to an UL packet delay measurement, it is impossible for the UE to report an UL packet discard rate measurement per QCI to the eNB, because there is no information about QCI field in RRC message. Therefore, new criteria of reporting UL packet discard measurement needs to be defined.

Figure 12:
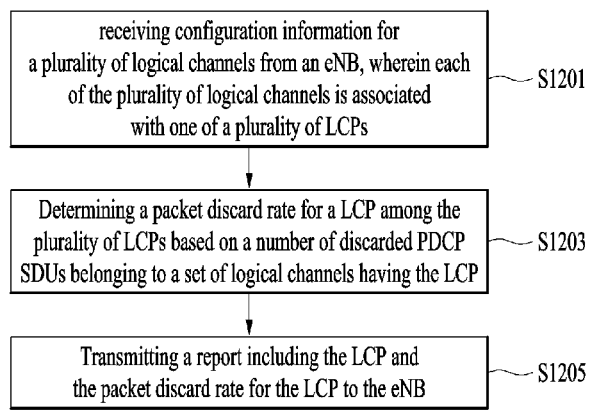
FIG. 12 is conceptual diagram for performing an UL packet discard rate measurement per LCP according to an exemplary embodiment of the present invention.

FIG. 12 is conceptual diagram for performing an UL packet discard rate measurement per LCP according to an exemplary embodiment of the present invention.

It is invented that the UE performs UL packet discard rate measurement per LCP and reports the UL packet discard rate measurement per LCP to an eNB. In detail, when the UE reports the UL packet delay measurement to the eNB, the UE transmits UL packet delay measurement report by including a LCP and the corresponding UL packet discard rate measurement result for the LCP.

Referring to FIG. 12, the UE receives configuration information for a plurality of logical channels from an eNB (S1201). Each of the plurality of logical channels is associated with one of a plurality of logical channel priorities.

The UE performs UL packet discard rate measurement per LCP.

For each LCP, the UE determines a packet discard rate for a LCP among the plurality of LCPs based on a number of discarded PDCP SDUs belonging to a set of logical channels having the LCP (S1203). Here, the packet discard rate for the LCP may be determined by recording the number of the discarded PDCP SDUs belonging to the set of logical channels during a certain time period, and dividing the number of the discarded PDCP SDUs belonging to the set of logical channels by a number of all PDCP SDUs belonging to the set of logical channels.

Meanwhile, the packet discard rate for the LCP may be determined by determining packet discard rates for each of a plurality of radio bearers (RBs) configured for the UE, and averaging packet discard rates for at least part of RBs, among the plurality of RBs, whose packet discard rate is above a threshold.

After performing the UL packet discard rate measurement, the UE transmits a report including the LCP and the packet discard rate for the LCP to a network (S1205). The report can include multiple LCPs and corresponding multiple packet discard rates. In some embodiments, the UE may receive a command to transmit the report from the network, and the report is transmitted when the command is received.

Figure 13:
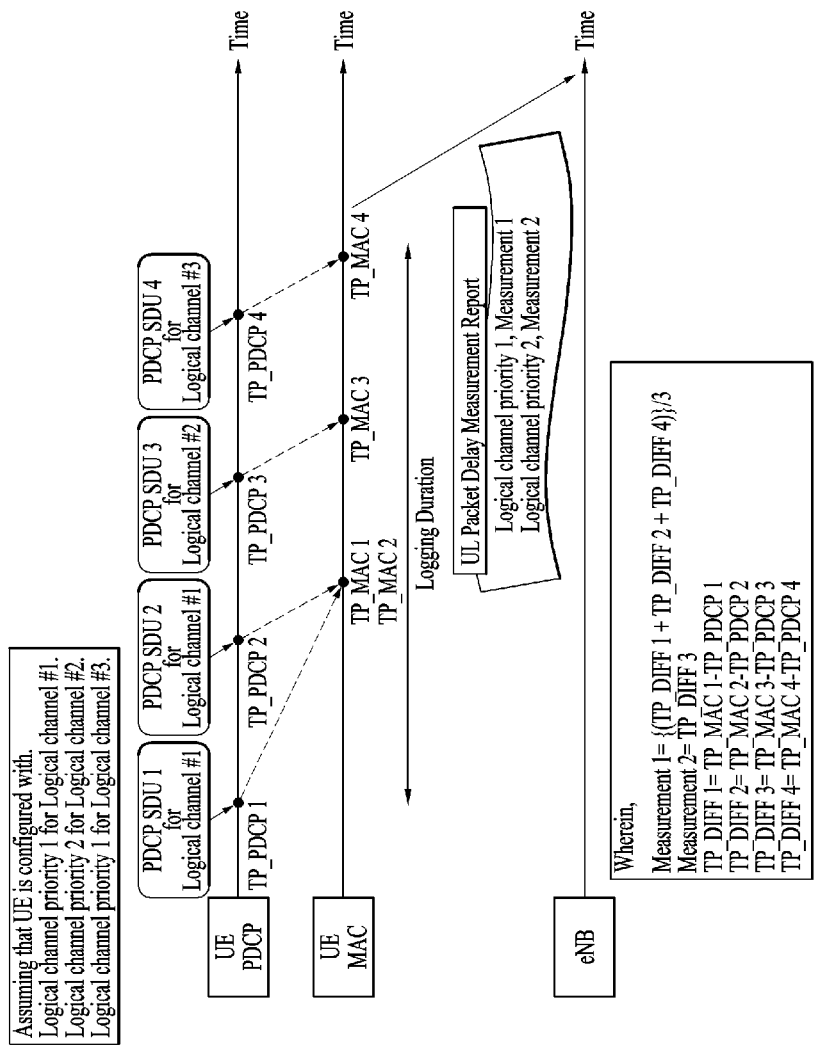
FIG. 13 shows an example of an UL packet measurement per LCP according to an exemplary embodiment of the present invention.
Figure 14:
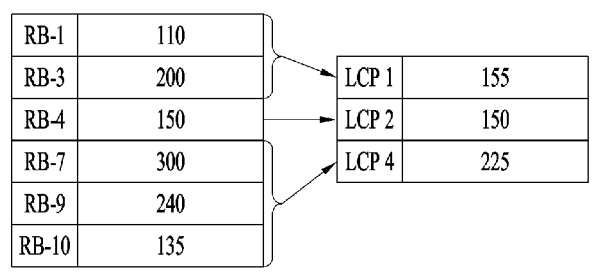
FIG. 14 shows another example of an UL packet measurement per LCP according to an exemplary embodiment of the present invention.

More specific examples for an UL packet measurement per LCP will be showed in FIGS. 13 and 14.

FIG. 13 shows an example of an UL packet measurement per LCP according to an exemplary embodiment of the present invention.

In the present exemplary embodiment, it is assumed that a UE is configured by an eNB with LCP 1 for Logical channel #1, LCP 2 for Logical channel #2, and LCP 1 for Logical channel #3.

For each PDCP SDU which arrives in PDCP upper SAP within a logging duration, the UE logs TP_PDCP for each PDCP SDU. Specifically, the UE logs a time point (TP_PDCP 1) when a PDCP SDU 1 for Logical channel #1 arrives at PDCP upper SAP, a time point (TP_PDCP 2) when a PDCP SDU 2 for Logical channel #1 arrives at PDCP upper SAP, a time point (TP_PDCP 3) when a PDCP SDU 3 for Logical channel #2 arrives at PDCP upper SAP, and a time point (TP_PDCP 4) when a PDCP SDU 4 for Logical channel #3 arrives at PDCP upper SAP.

For each PDCP SDU which arrives at MAC layer within a logging duration, the UE logs TP_MAC for each PDCP SDU. Specifically, the UE logs a time point (TP_MAC 1) when a first segment of the PDCP SDU 1 for Logical channel #1 arrives at MAC layer, a time point (TP_MAC 2) when a first segment of the PDCP SDU 2 for Logical channel #1 arrives at MAC layer, a time point (TP_MAC 3) when a first segment of the PDCP SDU 3 for Logical channel #2 arrives at MAC layer, and a time point (TP_MAC 4) when a first segment of the PDCP SDU 4 for Logical channel #3 arrives at MAC layer.

At the end of the logging duration, the UE calculates a time difference (TP_DIFF) between TP_PDCP and TP_MAC for each PDCP SDU. Specifically, the UE calculates a time difference (TP_DIFF 1) between TP_PDCP 1 and TP_MAC 1 for the PDCP SDU 1 (i.e., TP_DIFF 1=TP_MAC 1-TP_PDCP 1), a time difference (TP_DIFF 2) between TP_PDCP 2 and TP_MAC 2 for the PDCP SDU 2 (i.e., TP_DIFF 2=TP_MAC 2-TP_PDCP 2), a time difference (TP_DIFF 3) between TP_PDCP 3 and TP_MAC 3 for the PDCP SDU 3 (i.e., TP_DIFF 3=TP_MAC 3-TP_PDCP 3), and a time difference (TP_DIFF 4) between TP_PDCP 4 and TP_MAC 4 for the PDCP SDU 4 (i.e., TP_DIFF 4=TP_MAC 4-TP_PDCP 4).

After that, the UE performs uplink packet delay measurement for each LCP by dividing a summation of calculated TP_DIFFs of PDCP SDUs associated with same LCP by the number of the PDCP SDUs associated with same LCP within the logging duration. Specifically, the UE determines UL packet delay for LCP 1 (i.e., Measurement 1) by dividing a summation of TP_DIFF 1, TP_DIFF 2, and TP_DIFF 4 by 3, and UL packet delay for LCP 2 (i.e., Measurement 2) by dividing a summation of TP_DIFF 3 by 1.

The UE transmits UL packet delay measurement report to the eNB by using one of RRC/PDCP/RLC/MAC/PHY signalling. In the present exemplary embodiment, the UL packet delay measurement report includes LCP 1, Measurement 1, LCP 2, and Measurement 2.

FIG. 14 shows another example of an UL packet measurement per LCP according to an exemplary embodiment of the present invention.

If a UE transmits UL packet delay/discard rate measurement reports for each radio bearer (RB), an eNB could have more accurate and detailed information about the UE's delay and discard rate. However, it would cause signaling overhead. Even if many RBs are configured with the UE, some of them may be configured with same LCP. By reporting the UL packet delay/discard rate measurements per LCP, the UE can reduce signaling overhead and increase reporting efficiency.

For performing UL packet delay measurement per LCP, the UE may calculate UL packet delays for each PDCP SDU by recording a time duration between a time point when a PDCP SDU arrives at PDCP upper SAP and a time point when the first part of this PDCP SDU is delivered to MAC for each PDCP SDU. Then the UE sums up UL packet delays of all PDCP SDUs from RBs with same LCP during a measurement period (i.e., logging duration), and obtains an UL packet delay of the same LCP by dividing the summing result by the number of PDCP SDUs from RBs with the same LCP.

Or, for performing UL packet delay measurement per LCP, the UE calculates an average of UL packet delay of each LCP using UL packet delays of RBs having a PDCP SDU whose UL packet delay is above a threshold. For each LCP, the UE sums up all of UL packet delays of RBs with same LCP having a PDCP SDU whose UL packet delay is above a threshold during the measurement period, and obtains an UL packet delay of the same LCP by dividing the summing result by the number of RBs with the same LCP.

Or, for performing UL packet delay measurement per LCP, the UE calculates an average of UL packet delay of each LCP using UL packet delays of RBs which is above a threshold. For each LCP, the UE sums up all of UL packet delays of RBs with same LCP which is above a threshold during the measurement period, and obtains an UL packet delay of the same LCP by dividing the summing result by the number of RBs with the same LCP.

For performing UL packet discard rate measurement per LCP, The UE records the number of PDCP SDUs that are discarded due to expiry of discard timer during the measurement period. The UE counts the number of discarded PDCP SDUs from RBs with same LCP during the measurement period, and obtains an UL packet discard rate of the same LCP by dividing the counting result by the number of PDCP SDUs from RBs with the same LCP.

Or, for performing UL packet discard rate measurement per LCP, the UE calculates an average of UL packet discard rate of each LCP using UL packet discard rates of RBs whose UL packet discard rate is above threshold. For each LCP, the UE sums up all of UL packet discard rates of RBs with same LCP whose UL packet discard rate is above a threshold during measurement period, and obtains an UL packet discard rate of the same LCP by dividing the summing result by the number of RBs with the same LCP.

After performing UL packet delay/discard rate measurements, the UE constructs a UL Packet Measurement Report per LCP by including at least one set of followings: i) an ID of a LCP, ii) an UL packet delay of the LCP and/or an UL packet discard rate of the LCP.

Referring to FIG. 14, it is assumed that a UE is configured with 10 RBs, and one LCP is configured for each RB as Table 8 below, and UL packet delay values of each RB are obtained as Table 9 below.

TABLE 8

| RB | LCP | LCG |
|---|---|---|
| RB 1 | LCP 1 | LCG 1 |
| RB 2 | LCP 1 | LCG 1 |
| RB 3 | LCP 1 | LCG 1 |
| RB 4 | LCP 2 | LCG 3 |
| RB 5 | LCP 3 | LCG 4 |
| RB 6 | LCP 3 | LCG 3 |
| RB 7 | LCP 4 | LCG 1 |
| RB 8 | LCP 3 | LCG 2 |
| RB 9 | LCP 4 | LCG 1 |
| RB 10 | LCP 4 | LCG 1 |

TABLE 9

| RB | UL packet delay |
|---|---|
| RB 1 | 110 |
| RB 2 | 70 |
| RB 3 | 200 |
| RB 4 | 150 |
| RB 5 | 90 |
| RB 6 | 20 |
| RB 7 | 300 |
| RB 8 | 50 |
| RB 9 | 240 |
| RB 10 | 135 |

It is also assumed that the UE receives a threshold value of an UL packet delay of a RB by RRC signaling, and the threshold value is 90. According to Table 9, RB1, RB 3, RB 4, RB 7, RB 9 and RB 10 have UL packet delay which is above the threshold value.

During a measurement period, for each LCP, the UE sums up all of UL packet delays of RBs with same LCP whose UL packet delay is above the threshold value, and obtains an UL packet delay of the same LCP by dividing the summing result by the number of RBs with the same LCP whose UL packet delay is above the threshold value. Specifically, an UL packet delay of LCP 1 is determined as 155 (i.e., (UL packet delay of RB 1+UL packet delay of RB 3)/the number of RBs with LCP 1 whose UL packet delay is above 90=(110+200)/2=155). Similarly, an UL packet delay of LCP 2 is determined as 150 (i.e., UL packet delay of RB 4/the number of RBs with LCP 2 whose UL packet delay is above 90=150/1=150). Similarly, an UL packet delay of LCP 4 is determined as 225 (i.e., (UL packet delay of RB 7+UL packet delay of RB 9+UL packet delay of RB 10)/the number of RBs with LCP 4 whose UL packet delay is above 90=(300+240+135)/3=225).

Then the UE constructs and transmits an UL Packet Measurement Report including ID(s) of LCP(s) and UL packet delay(s) of the LCP(s). In the present exemplary embodiment, the UL Packet Measurement Report may include LCP 1, LCP 2, LCP 4, an UL packet delay of LCP 1 (i.e. 155), an UL packet delay of LCP 2 (i.e. 150), and an UL packet delay of LCP 4 (i.e. 225).

According to the present exemplary embodiment, it has less reporting overhead than an UL Packet Measurement report per RB. Moreover, it can also provide measurement result with sufficient accuracy, because a QCI is closely related to a LCP.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   receiving configuration information for a plurality of logical channels from a base station (BS),
      wherein each of the plurality of logical channels is associated with one of a plurality of logical channel priorities;
   calculating packet delays for packet data convergence protocol service data units (PDCP SDUs) belonging only to a set of logical channels having a same logical channel priority, among the plurality of logical channel priorities;
   determining a packet delay for the same logical channel priority based on the packet delays for the PDCP SDUs; and
   transmitting a report including the same logical channel priority and the packet delay for the same logical channel priority to the BS,
   wherein the packet delay for the same logical channel priority is determined by averaging the packet delays for the PDCP SDUs received from an upper layer during a certain time period,
   wherein packet delay for a PDCP SDU among the PDCP SDUs is calculated by:
      logging a first time point when the PDCP SDU is received at a PDCP entity from the upper layer;
      logging a second time point when a first segment of the PDCP SDU is delivered to a medium access control (MAC) entity; and
      calculating the packet delay for the PDCP SDU by subtracting the first time point from the second time point.

2. The method according to claim 1, wherein the packet delays for the PDCP SDUs are calculated during a certain time period.

3. The method according to claim 1, further comprising:
   receiving a command to transmit the report from the BS, wherein the report is transmitted when the command is received.

4. The method according to claim 1, further comprising:
determining a packet delay for another same logical channel priority by calculating packet delays for PDCP SDUs belonging only to a set of logical channels having the another same logical channel priority,
wherein the report further includes the another same logical channel priority and the packet delay for the another same logical channel priority.

5. The method according to claim 1, further comprising:
counting a number of discarded PDCP SDUs belonging only to the set of logical channels having the same logical channel priority among the plurality of logical channel priorities;
determining a packet discard rate for the same logical channel priority based on the number of the discarded PDCP SDUs; and
transmitting a report including the same logical channel priority and the packet discard rate for the same logical channel priority to the BS.

6. The method according to claim 5, wherein the packet discard rate for the same logical channel priority is determined by:
recording the number of the discarded PDCP SDUs belonging only to the set of logical channels during a certain time period; and
dividing the number of the discarded PDCP SDUs belonging only to the set of logical channels by a number of all PDCP SDUs belonging only to the set of logical channels.

7. The method according to claim 6, wherein the packet discard rate for the same logical channel priority is determined by:
determining packet discard rates for each of a plurality of radio bearers (RBs) configured for the UE; and
averaging packet discard rates for at least part of RBs, among the plurality of RBs, whose packet discard rate is above a threshold.

8. A User Equipment (UE) for operating in a wireless communication system, the UE comprising:
a transmitter and a receiver; and
a processor operably coupled with the transmitter and the receiver and configured to:
receive configuration information for a plurality of logical channels from a base station (BS),
wherein each of the plurality of logical channels is associated with one of a plurality of logical channel priorities;
calculate packet delays for packet data convergence protocol service data units (PDCP SDUs) belonging only to a set of logical channels having a same logical channel priority among the plurality of logical channel priorities;
determine a packet delay for the same logical channel priority based on the packet delays for the PDCP SDUs; and
transmit a report including the logical channel priority and the packet delay for the logical channel priority to the BS,
wherein the packet delay for the same logical channel priority is determined by averaging the packet delays for the PDCP SDUs received from an upper layer during a certain time period,
wherein the processor calculates packet delay for a PDCP SDU among the PDCP SDUs by:
logging a first time point when the PDCP SDU is received at a PDCP entity from the upper layer;
logging a second time point when a first segment of the PDCP SDU is delivered to a medium access control (MAC) entity; and
calculating the packet delay for the PDCP SDU by subtracting the first time point from the second time point.

9. The UE according to claim 8, wherein the packet delays for the PDCP SDUs is calculated during a certain time period.

10. The UE according to claim 8, wherein the processor is further configure to:
receive a command to transmit the report from the BS,
wherein the report is transmitted when the command is received.

11. The UE according to claim 8, wherein the processor is further configure to:
determine a packet delay for another same logical channel priority by calculating packet delays for PDCP SDUs belonging only to a set of logical channels having the another same logical channel priority,
wherein the report further includes the another same logical channel priority and the packet delay for the another same logical channel priority.

12. The UE according to claim 8, the processor is further configured to:
count a number of discarded PDCP SDUs belonging only to a set of logical channels having a same logical channel priority among the plurality of logical channel priorities;
determine a packet discard rate for the same logical channel priority based on the number of the discarded PDCP SDUs; and
transmit a report including the same logical channel priority and the packet discard rate for the same logical channel priority to the BS.

13. The UE according to claim 12, wherein the processor determines the packet discard rate for the same logical channel priority by:
recording the number of the discarded PDCP SDUs belonging only to the set of logical channels during a certain time period; and
dividing the number of the discarded PDCP SDUs belonging only to the set of logical channels by a number of all PDCP SDUs belonging only to the set of logical channels.

14. The UE according to claim 12, wherein the processor determines the packet discard rate for the same logical channel priority by:
determining packet discard rates for each of a plurality of radio bearers (RBs) configured for the UE; and
averaging packet discard rates for at least part of RBs, among the plurality of RBs, whose packet discard rate is above a threshold.

* * * * *